(12) United States Patent
Bobbitt et al.

(10) Patent No.: US 8,345,101 B2
(45) Date of Patent: Jan. 1, 2013

(54) AUTOMATICALLY CALIBRATING REGIONS OF INTEREST FOR VIDEO SURVEILLANCE

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/262,446

(22) Filed: Oct. 31, 2008

(65) Prior Publication Data

US 2010/0110183 A1     May 6, 2010

(51) Int. Cl.
*H04N 7/18*     (2006.01)
(52) U.S. Cl. .......................... 348/150; 348/143; 348/169
(58) Field of Classification Search .................. 348/143, 348/150, 157, 169
See application file for complete search history.

(56) References Cited

U.S. PATENT DOCUMENTS

| | | | |
|---|---|---|---|
| 4,679,077 A * | 7/1987 | Yuasa et al. ................ 348/154 |
| 4,701,849 A | 10/1987 | Elden | |
| 4,991,008 A | 2/1991 | Nama | |
| 5,099,322 A * | 3/1992 | Gove ............................ 348/700 |
| 5,729,471 A * | 3/1998 | Jain et al. ..................... 725/131 |
| 5,745,036 A | 4/1998 | Clare | |
| 5,748,085 A | 5/1998 | Davis et al. | |
| 5,920,338 A | 7/1999 | Katz | |
| 5,965,861 A | 10/1999 | Addy et al. | |
| 6,075,560 A | 6/2000 | Katz | |
| 6,154,149 A * | 11/2000 | Tyckowski et al. ............ 340/903 |
| 6,236,736 B1 * | 5/2001 | Crabtree et al. ............... 382/103 |
| 6,259,803 B1 * | 7/2001 | Wirtz et al. .................... 382/103 |
| 6,424,370 B1 * | 7/2002 | Courtney ........................ 348/143 |
| 6,462,774 B1 * | 10/2002 | Bildstein ........................ 348/143 |
| 6,463,432 B1 * | 10/2002 | Murakawa ............................ 1/1 |
| 6,636,635 B2 | 10/2003 | Matsugu | |
| 6,793,128 B2 | 9/2004 | Huffman | |

(Continued)

FOREIGN PATENT DOCUMENTS

WO    WO 2005/102175    * 11/2005

(Continued)

OTHER PUBLICATIONS

Harasse et al., "Automated Camera Dysfunction Detection", 2004, retrieved from <http://ieeexplore.ieee.org/stamp/stamp.jsp?tp=&arnumber=1300940>.*

(Continued)

*Primary Examiner* — David Lazaro
*Assistant Examiner* — Sarah Drabik
(74) *Attorney, Agent, or Firm* — Ryan, Mason & Lewis, LLP (57) ABSTRACT

Techniques for automatically calibrating one or more regions of interest for video surveillance are provided. The techniques include at a user-defined frequency, determining if one or more regions of interest (ROIs) are present within a field of view of a camera, if one or more ROIs are present within the field of view of the camera, automatically calibrating the one or more ROIs within the field of view of the camera, and if one or more ROIs are not present within the field of view of the camera, sending an alert to a user.

21 Claims, 4 Drawing Sheets

U.S. PATENT DOCUMENTS

| | | | |
|---|---|---|---|
| 6,847,393 | B2 | 1/2005 | Ashe et al. |
| 6,871,185 | B2 | 3/2005 | Walker et al. |
| 6,970,810 | B1 | 11/2005 | Matsko |
| 6,998,987 | B2 | 2/2006 | Lin |
| 7,004,382 | B2 | 2/2006 | Sandru |
| 7,028,269 | B1 * | 4/2006 | Cohen-Solal et al. ........ 715/863 |
| 7,080,778 | B1 | 7/2006 | Kressin et al. |
| 7,100,824 | B2 | 9/2006 | Ostrowski et al. |
| 7,130,468 | B1 * | 10/2006 | Meyer et al. .................. 382/219 |
| 7,246,745 | B2 | 7/2007 | Hudnut et al. |
| 7,295,942 | B2 * | 11/2007 | Joublin et al. .................. 702/94 |
| 7,319,479 | B1 | 1/2008 | Crabtree et al. |
| 7,328,844 | B2 | 2/2008 | Workers |
| 7,448,542 | B1 | 11/2008 | Bobbitt et al. |
| 7,503,490 | B1 | 3/2009 | Bobbitt et al. |
| 7,548,253 | B2 * | 6/2009 | Kang ............................ 348/187 |
| 7,562,817 | B2 | 7/2009 | McQueen et al. |
| 7,631,808 | B2 * | 12/2009 | Kundu et al. .................. 235/383 |
| 7,646,745 | B2 | 1/2010 | Caldwell et al. |
| 7,688,349 | B2 | 3/2010 | Flickner et al. |
| 7,733,375 | B2 * | 6/2010 | Mahowald ............... 348/207.99 |
| 7,751,647 | B2 * | 7/2010 | Pikaz ............................ 382/278 |
| 7,817,914 | B2 * | 10/2010 | Kuberka et al. .............. 396/263 |
| 7,822,252 | B2 | 10/2010 | Bi et al. |
| 7,957,565 | B1 | 6/2011 | Sharma et al. |
| 8,019,170 | B2 * | 9/2011 | Wang et al. .................... 382/239 |
| 2002/0044691 | A1 | 4/2002 | Matsugu |
| 2003/0107649 | A1 | 6/2003 | Flickner et al. |
| 2003/0174869 | A1 | 9/2003 | Suarez |
| 2004/0064372 | A1 | 4/2004 | Freeny, Jr. |
| 2004/0066966 | A1 | 4/2004 | Schneiderman |
| 2004/0066970 | A1 | 4/2004 | Matsugu |
| 2004/0095477 | A1 * | 5/2004 | Maki et al. ................. 348/222.1 |
| 2005/0141765 | A1 | 6/2005 | Liang et al. |
| 2005/0146605 | A1 | 7/2005 | Lipton et al. |
| 2005/0162515 | A1 | 7/2005 | Venetianer et al. |
| 2005/0162540 | A1 * | 7/2005 | Yata ............................. 348/345 |
| 2005/0265582 | A1 | 12/2005 | Buehler et al. |
| 2006/0072010 | A1 * | 4/2006 | Haering et al. ............... 348/143 |
| 2006/0095317 | A1 | 5/2006 | Brown et al. |
| 2006/0104479 | A1 | 5/2006 | Bonch-Osmolovskiy et al. |
| 2006/0243798 | A1 | 11/2006 | Kundu et al. |
| 2006/0251324 | A1 | 11/2006 | Bachmann et al. |
| 2007/0036395 | A1 | 2/2007 | Okun |
| 2007/0043608 | A1 | 2/2007 | May et al. |
| 2007/0076957 | A1 * | 4/2007 | Wang et al. ................... 382/195 |
| 2007/0174214 | A1 | 7/2007 | Welsh et al. |
| 2007/0236570 | A1 * | 10/2007 | Sun et al. ...................... 348/159 |
| 2007/0272734 | A1 | 11/2007 | Lipton et al. |
| 2007/0279494 | A1 * | 12/2007 | Aman et al. ................... 348/169 |
| 2008/0100704 | A1 | 5/2008 | Venetianer et al. |
| 2008/0122926 | A1 | 5/2008 | Zhou et al. |
| 2008/0136910 | A1 * | 6/2008 | Berkey et al. ................. 348/143 |
| 2008/0152232 | A1 * | 6/2008 | Skans ........................... 382/209 |
| 2008/0198225 | A1 | 8/2008 | Gal et al. |
| 2009/0040303 | A1 * | 2/2009 | Finn et al. ...................... 348/143 |
| 2009/0222354 | A1 | 9/2009 | Murphy et al. |
| 2009/0290802 | A1 | 11/2009 | Hua et al. |

FOREIGN PATENT DOCUMENTS

| | | |
|---|---|---|
| WO | WO 2006/105376 A2 | 10/2006 |
| WO | WO 2008/008505 | 1/2008 |
| WO | WO 2008/083869 | 7/2008 |

OTHER PUBLICATIONS

Office Action dated Sep. 29, 2010 for U.S. Appl. No. 12/262,458, filed Oct. 31, 2008, titled, Using Detailed Process Information at a Point of Sale, pp. 1-11.

Notice of Allowance dated Feb. 7, 2011 for U.S. Appl. No. 12/262,458, filed Oct. 31, 2008, titled, Using Detailed Process Information at a Point of Sale, pp. 1-6.

Spielholz et al., Field Evaluation of a New Grocery Checkstand Design, Applied Ergonomics, 2008—Elsevier.

Shinnar et al., Survey of Ergonomic Features of Supermarket Cash Registers, Industrial Ergonomics, 2004—Elsevier.

JD VonAchen, EMGT 835 Field Project: A Labor Measurement Structure for Retail Operations, kuscholarworks.ku. edu, 2006.

Das, Industrial Workstation Design: A Systematic Ergonomics Approach, Applied Ergonomics, 1996—Elsevier.

Hitchcock et al., Integrating Ergonomics in the Design Process: A Practical Case Study, The Design Journal, 2004—ingentaconnect. com.

Vargas, Universal Design of a Future Grocery Retail Checkstand, 2008, etd.gatech.edu.

Bajaj, Redesign and Evaluation of the Grocery Store Self-Checkout Systems from Universal Design Perspectives, 2003, repository.lib. ncsu.edu.

Mustafa et al. Unsupervised Event Detection in Videos, Tools with Artificial Intelligency, 2007.

Carrasco et al., Packing Products for Customers, and Ergonomics Evaluation of three Supermarket Checkouts, Applied Ergonomics, 1995—Elsevier.

Winnemuller, Ergonomic Evaluation of Grocery Checkstands, University of Washington, 2003.

* cited by examiner

AUTOMATICALLY CALIBRATING REGIONS OF INTEREST FOR VIDEO SURVEILLANCE

CROSS-REFERENCE TO RELATED APPLICATIONS

The present application is related to U.S. patent application entitled "Generating an Alert Based on Absence of a Given Person in a Transaction," identified by Ser. No. 12/262/454, and filed concurrently herewith, the disclosure of which is incorporated by reference herein in its entirety.

Additionally, the present application is related to U.S. patent application entitled "Using Detailed Process Information at a Point of Sale," identified by Ser. No. 12/262/458, and filed concurrently herewith, the disclosure of which is incorporated by reference herein in its entirety.

The present application is also related to U.S. patent application entitled "Creating a Training Tool," identified by Ser. No. 12/262,467, and filed concurrently herewith, the disclosure of which is incorporated by reference herein in its entirety.

FIELD OF THE INVENTION

The present invention generally relates to information technology, and, more particularly, to video surveillance.

BACKGROUND OF THE INVENTION

Video retail checkout activity analysis systems operate in terms of one or more regions of interest (ROI) which correspond to salient regions in the checkout area (for example, entry belt, barcode scanner, exit belt, cashier work area, register, etc.).

However, manual calibration of these ROIs is very time-consuming and quickly becomes difficult to manage as the number of stores and/or lanes increases. Additionally, this calibration needs to be performed any time the corresponding camera moves (either intentionally or unintentionally), is blocked or enters an operational state that renders video analytics non-functional (for example, loss of focus, damaged lens, etc.). When conditions such as these occur, the ROIs are no longer positioned in the correct area or are no longer meaningful. As a result, the system will perform sub-optimally or give incorrect results. Furthermore, a human may remain unaware of an issue for an extended period of time.

Existing approaches include an initial calibration that is a manual process performed by a human, where each human specifies each ROI on each checkout station according to the initial camera field of view. As noted above, this is very time-consuming proportional to the number of checkout stations that need to be configured. Additionally, existing approaches can also include calibration subsequent to installment via periodic manual inspection. This, however, also includes the same disadvantages noted above multiplied by the frequency of inspection. Additionally, such disadvantages become magnified when, for example, the number of stores gets into the hundreds and thousands, and where each store may have as many as 50 checkout lanes.

SUMMARY OF THE INVENTION

Principles of the present invention provide techniques for automatically calibrating one or more regions of interest (ROIs) for video surveillance. An exemplary method (which may be computer-implemented) for automatically calibrating one or more regions of interest for video surveillance, according to one aspect of the invention, can include steps of at a user-defined frequency, determining if one or more regions of interest (ROIs) are present within a field of view of a camera, if one or more ROIs are present within the field of view of the camera, automatically calibrating the one or more ROIs within the field of view of the camera, and if one or more ROIs are not present within the field of view of the camera, sending an alert to a user.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include automatic regions of interest (ROI) calibration for video surveillance (for example, physical surveillance, retail surveillance, retail checkout surveillance, retail security, etc.). By way of example, one or more embodiments of the invention can be used in checkout activity analysis systems, such as, for example, point-of-sale fraud detection, and in using video analytics. In contrast to the disadvantageous existing approaches detailed above, the techniques described herein include making the ROI calibration phase of deployment automatic, relieving a human from having to manually calibrate ROIs.

In one or more embodiments of the invention, a video analytics component analyzes a video stream for characteristic checkout station components to determine one or more ROIs which correspond to one or more areas in the camera field of view bounded by, for example, bounding boxes, polygons, enclosed curves, fuzzy regions, etc. Checkout stations can come in many different form factors, and may include, for example, an entry area (where the customer deposits items to be purchased), a scan area (where the cashier enters the items into the transaction) and an exit area (where items entered into the transaction are deposited for bagging and/or pick-up by the customer). For example, barcode scanners are generally rectangular objects near the center of activity, with a dark rectangle of glass in their center. The entry and exit area are, by way of example, belts or static surfaces that extend outward from the scanner. The register can be detected based on its shape and relationship to the other detected regions. Once these exemplary objects are detected, ROIs can be superimposed accordingly, and according to the application needs.

One or more embodiments of the invention also include re-calibrating ROIs when a camera is moved. Intentional movements may be required to accommodate structural changes in the building (for example, installing an air conditioner). Also, unintentional movements may occur as the result of the camera being nudged inadvertently. The result of such a move, either intentional or unintentional may also cause the checkout station to leave the camera's field of view. The camera may also be blocked or go out of focus or move in some other way that renders the video analytics processing ineffectual.

The techniques described herein include periodically re-initializing ROIs. Therefore, ROIs are properly recalibrated in response to reasonable movements (such as, for example, those described above). In instances where the camera is changed so that the video analytics is ineffectual, the ROIs will likely not be found. In this circumstance, one or more embodiments of the present invention alert human operators of the condition so that it can be corrected.

In one or more embodiments of the invention, an exemplary video analytics system to analyze checkout station activity can include an overhead camera positioned over each checkout station. Other possible configurations can include, by way of example, different camera views and a one-to-many relationship between cameras and checkout stations. As such, in one or more embodiments of the present invention, the video stream from each camera is fed into a computer system and processed by a video analytics module.

Further, at the time of installment, the analytics module may not have any ROIs. As each frame is processed, the analytics module searches for the object that is characteristic of an item such as, for example, a barcode scanner (for example, using standard techniques). Once, for example, the barcode scanner is found, other items such as the entry, exit areas and cash register are located. The area where the cashier stands can also be inferred from the location of these regions (for example, next to the scanner and cash register). ROIs can be drawn according to the location of these regions, and according to the application needs. Additionally, the ROIs can be sent to back-end modules, which are activated.

As described herein, one or more embodiments of the invention include techniques for automatically finding ROIs. One or more embodiments include using machine learning and a pattern recognition algorithm. Such techniques can include, for example, automatically learning the check-out station ROIs over time with information extracted from moving objects and people in the field of views (FOVs).

When a video image is acquired by the visual analytic module, motion detection can be performed. Motion detecting techniques can include, for example, background modeling, temporal texture modeling, optical flow estimation, region segmentation and tracking, etc. Once the foreground moving objects are localized and tracked, various features of the objects can be extracted. Exemplary features can include optical flows, color statistics, spatial gradient, temporal gradient, temporal texture, object locations and object trajectories. Such features represent the motion characteristics in different places in the camera field-of-view (FOV).

Based on the features extracted from foreground moving objects, a spatiotemporal heap map for the camera field-of-view can be generated. Values in the heat map represent the motion probabilities at the corresponding image locations. As such, high-value regions in the heat map represent regions in the camera field-of-view that have frequent motion (for example, a barcode scanner region, a pick up belt, a receipt printer, a cashier station, a customer idle, etc.). In addition, the heat map also possesses the temporal sequence order between the high motion interest regions. By way of example, motion activities that occur in the barcode scanner region usually happen after corresponding activities occur in the pick-up region. Similarly, activities in the drop-down (or loading/bagging) region usually occur after activities in the barcode reader region.

Given the generated spatiotemporal motion heat map, correlation between high-value regions and barcode stream can be achieved by performing temporal matching between visual activities and received barcodes. Based on the domain knowledge that activities that happen in the barcode reader region are mostly accompanied with received barcode signals, the barcode region can be identified. As such, the technique described herein finds the high motion region (high-value region in the heat map) with the most activities that are accompanied by the barcode signal in the temporal domain.

Once the barcode reader region is localized, other regions can be further identified utilizing the domain knowledge of common retail check-out stations. One or more embodiments of the invention include detecting several types of regions-of-interests (ROIs). Detection of other types of ROIs can be carried out in the same procedure using given domain knowledge. By way of example, the pick-up belt region can be identified as the one with activities that occurred right before the barcode reader region. Similarly, the drop-down region (where customer bags products) can be identified as the ROI with activities that occurred after the barcode reader region.

Also, for example, once the three ROIs (that is, pick-up, barcode scanner and drop-down) are localized in the video FOV, they can form the major axis of the check-out station. As such, the ROIs of cashier station and customer aisle are inferred as the regions that are on the two sides of the extracted major axis of the check-out station. To further distinguish between the cashier station ROI and the customer aisle ROI, the coherence of the motion in these two regions can be analyzed. Because the cashier mostly remains in a small and closed region, the corresponding ROI possesses less motion. On the other hand, the ROI for customers has a more scattered motion pattern because different customers pass through the isle from one end to the other. Other ROIs such as, for example, a receipt printer and a register keyboard can be determined by employing specific domain knowledge.

The output of such a module can include a set of target ROIs that corresponds to high-interest regions in the camera field-of-view. The ROIs could have exact boundaries in various forms (for example, polygon, enclosed curved region, etc.), and/or in a fuzzy shape where the boundaries of the ROIs are not hard-lined, but rather a shaded probabilistic boundary. In the latter case, the size of the ROI is dynamic depending on a cut-off threshold.

One or more embodiments of the invention can also include using a template matching based algorithm. Such techniques can include, for example, detecting ROIs based on a template matching algorithm, where one or more of the target ROI's models are used to find similar ROIs in the camera field-of-view. This technique can include using pre-defined or pre-selected ROI models different from those described above that can be based on the learning of a scene. Also, this technique can be processed instantaneously.

Starting with the detection of a barcode reader ROI, a set of pre-selected ROI models are collected into the knowledge pool of the problem. When a new video image is obtained by the visual analytic module, a set of various features are extracted. In such a technique, spatial features are used more so than temporal/motion features because ROI templates are constructed using spatial features. Some of the visual features, for example, can include edges, detected corners, lines, curves, region descriptors, shape descriptor, color statistics, texture statistics, etc.

Once the features are extracted, the barcode reader region ROI template or templates are compared with the feature maps of the video input. Some matching and/or detection techniques can include image convolution, feature statistics matching, feature domain matching and geometric transformations (affine, perspective, etc.). Once the barcode reader region is localized, retail check-out station domain knowledge can be utilized to localize spatially related ROIs. For example, given the orientation and location of a detected barcode reader ROI, the pick-up and drop-down ROIs can be determined based on the relative spatial layout of the check-out lane.

Similarly, other ROIs such as a cashier station and a customer aisle can also be identified with a combination of template detection and spatial lay-out inference. The output of such a module can include a set of target ROIs that correspond to high-interest regions in the camera field-of-view.

As described herein, one or more embodiments of the invention can include using object detection techniques to periodically find ROIs and using a machine learning technique to verify object detection. Heat maps can be generated over time and fitted to the transaction stream (that is, areas of high activity should be strongly correlated with high transactional activity).

In the techniques described herein, if ROIs are not found, one or more embodiments of the invention send an alert (for example, to a central monitoring department) to be disseminated by a human operator that the camera needs to be checked (for example, a "camera check alert"). Once ROIs are found, a heat map can be maintained that reflects activity in the camera view. Over time, the heat map can note activity (for example, which can be present in the entry, scanner, exit and cashier area). If this is not the case, a camera check alert can be generated.

One or more embodiments of the invention also include a validation step noting that specific high activity in the scanner region should generally correspond to transaction item entry events over time. If this is not the case, a camera check alert can be generated. Additionally, for example, at a user-defined interval, one or more embodiments of the invention can repeat the search process to handle possible camera movements.

As described herein, one or more embodiments of the invention, unlike disadvantageous existing approaches, include an automatic multi-layered validation scheme for correct ROI calibration (including, for example, an ROI locator, an activity heat map, an activity of barcode scanner heat map in correspondence with a transaction log (TLOG), etc.). The techniques described herein are also scalable, and can additionally include a provision for automatically alerting a user of possible problems that prevent the system from functioning properly (for example, due to camera movement, blockage, loss of focus, etc.).

Figure 1:
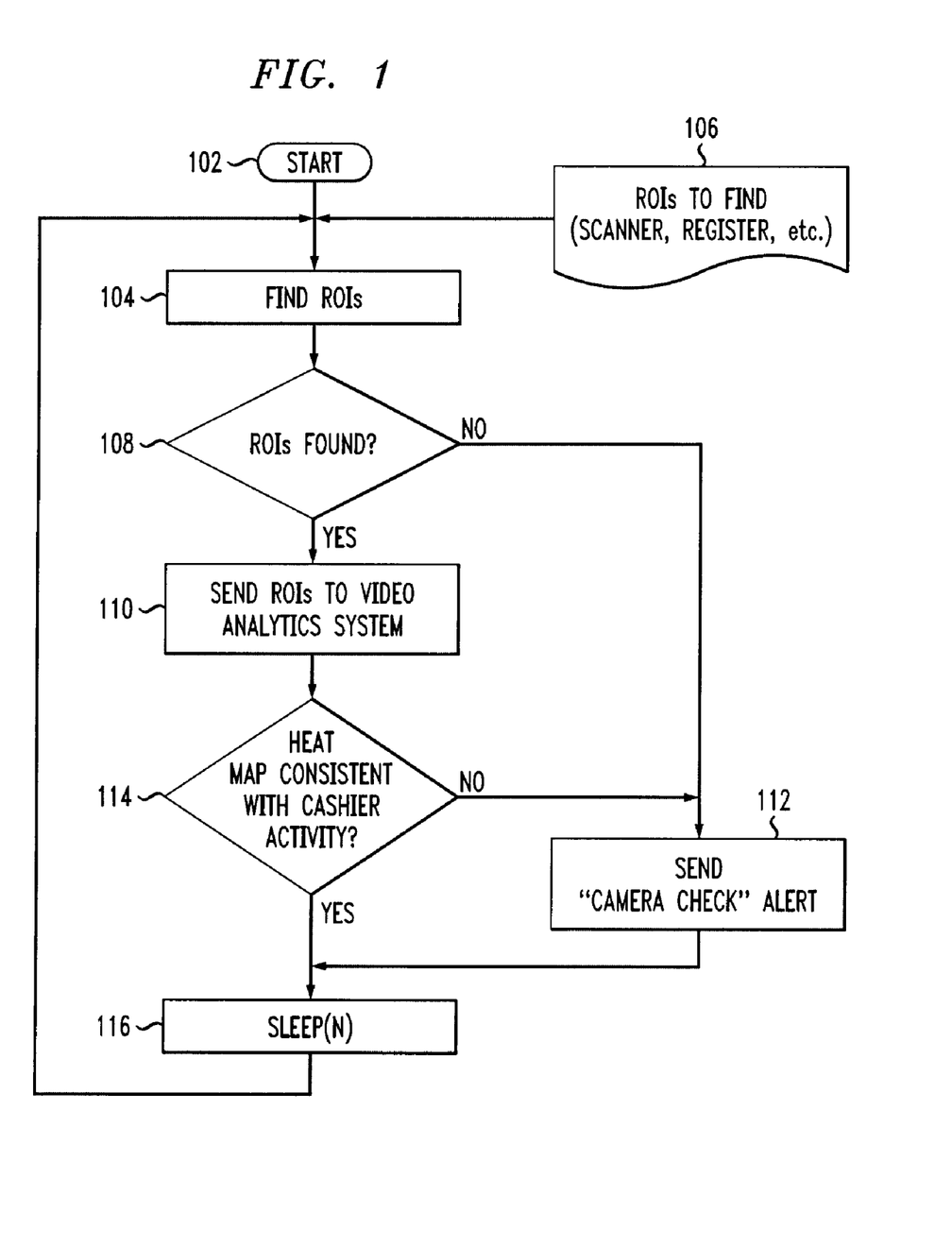
FIG. 1 is a diagram illustrating automatic region of interest (ROI) calibration for video surveillance, according to an embodiment of the present invention.

FIG. 1 is a flow diagram illustrating techniques for automatic regions of interest (ROI) calibration for video surveillance, according to an embodiment of the present invention. Step 102 includes starting the techniques. Step 104 includes finding ROIs via step 106 which includes identifying particular ROIs (such as, for example, a scanner, a register, etc.). Step 108 includes determining whether or not ROIs have been found. If ROIs have been found, step 110 includes sending the ROIs to a video analytics system. Also, step 114 includes determining whether a heat map is consistent with cashier activity. If the answer to the question in step 114 is yes, then step 116 includes having the system enter a sleep mode, at which point one can proceed back to step 104.

If, in step 108, no ROIs are found, then one can proceed to step 112 and send a "Camera Check" alert to a user, at which point the system can enter a sleep mode and proceed back to step 104. Also, if, in step 114, the heat map is inconsistent with cashier activity, then one can also proceed to step 112 and send a "Camera Check" alert to a user, at which point the system can enter a sleep mode and proceed back to step 104.

As illustrated in FIG. 1, the system periodically searches for ROIs (that is, the input) in the camera's field of view. If ROIs are found, they are sent to the video analytics system, otherwise an alert is sent to a user to check the camera. Additionally, if ROIs are found, a heat map is maintained that reflects activity, in particular, ROIs that are expected to have a high degree of activity (for example, a barcode scanner region). If (for example, over time) the activity detected is not consistent with the level of activity that is expected, an alert is sent to a user to check the camera. Further, one or more embodiments of the invention include repeating the techniques described herein at a user-defined frequency N.

Figure 2:
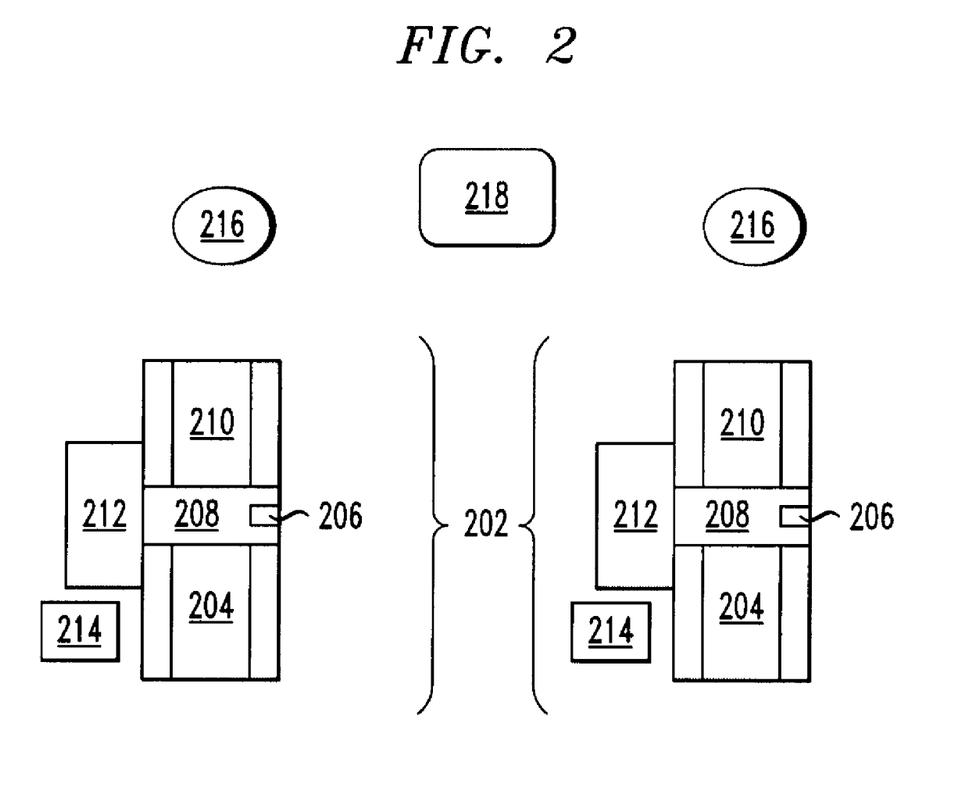
FIG. 2 is a diagram illustrating an overhead view of an exemplary point-of-sale environment, according to an embodiment of the present invention.

FIG. 2 is a diagram illustrating an overhead view of an exemplary point-of-sale environment, according to an embodiment of the present invention. By way of illustration, FIG. 2 includes a checkout area 202, which includes an entry area 204 (for example, where the customer deposits items to be purchased), a scan area 208 (for example, where the cashier enters the items into the transaction) including a scanner 206 (for example, a barcode scanner) and an exit area 210 (for example, where items entered into the transaction are deposited for bagging and/or pick-up by the customer). A checkout area 202 can also include a cashier work area 212 and a register 214.

As also depicted in FIG. 2, one or more embodiments of the invention include a camera 216. By way of example, an overhead camera positioned over each checkout station, as well as positioning different camera views and a one-to-many relationship between cameras and checkout stations. Additionally, in one or more embodiments of the present invention, the video stream from each camera 216 can be fed into a computer system 218 and processed by a video analytics module. Additionally, by way of example, a fraud detection module (or other type of back-end) and/or heat map generation can exist on a computer system 218, but as separate software components. Further, the computer system 218 can generate and send an alert or annotation to a user, as described herein.

Figure 3:
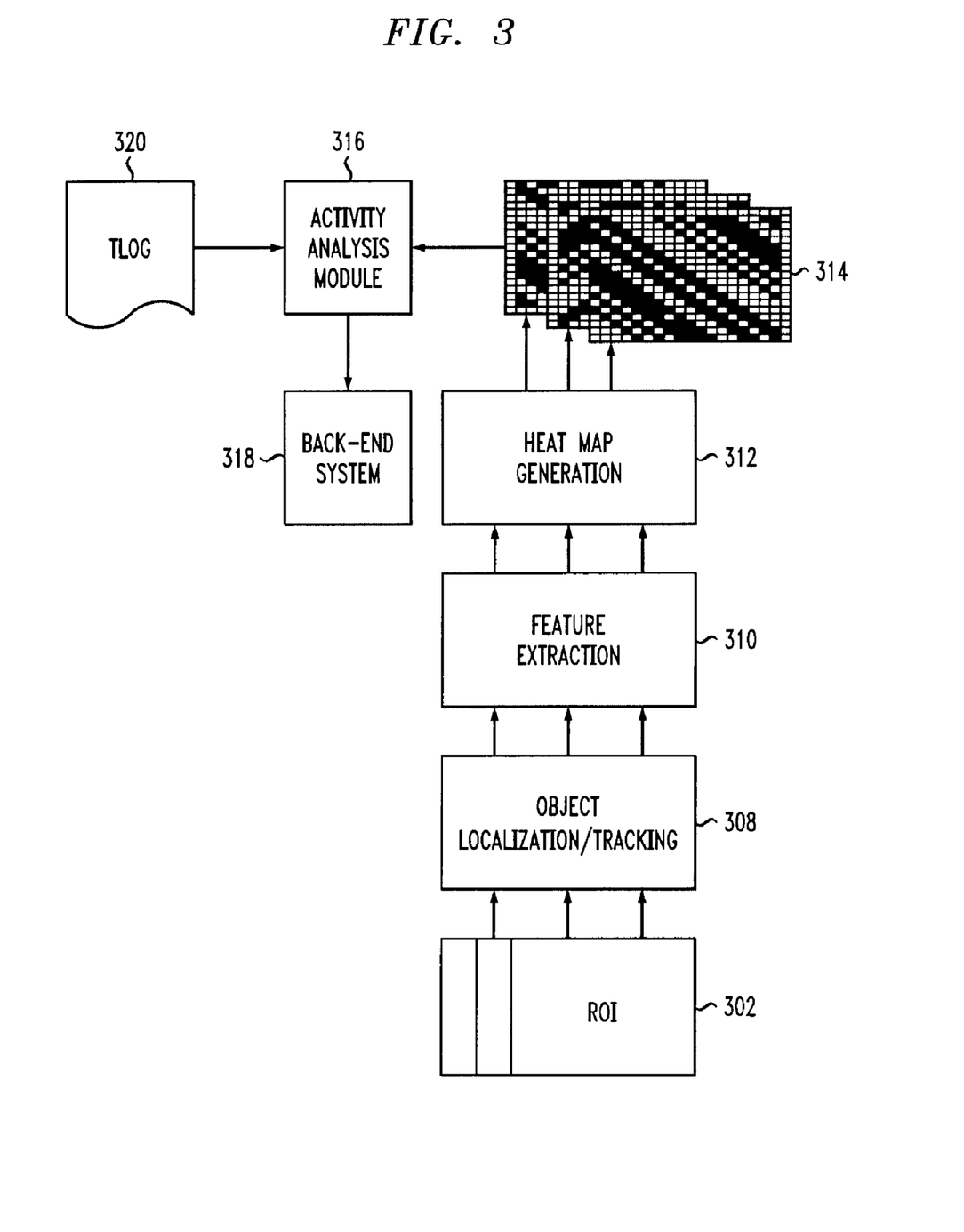
FIG. 3 is a diagram illustrating heat map generation in a system automatically calibrating one or more regions of interest for video surveillance.

FIG. 3 is a diagram illustrating heat map generation in a system automatically calibrating one or more regions of interest for video surveillance. By way of illustration, FIG. 3 depicts a region of interest (ROI) 302, an object localization/tracking component 308, a feature extraction component 310, a heat map generation component 312 and a heat map 314.

Further, FIG. 3 depicts an activity analysis module 316, a back-end system 318 and a TLOG 320.

Figure 4:
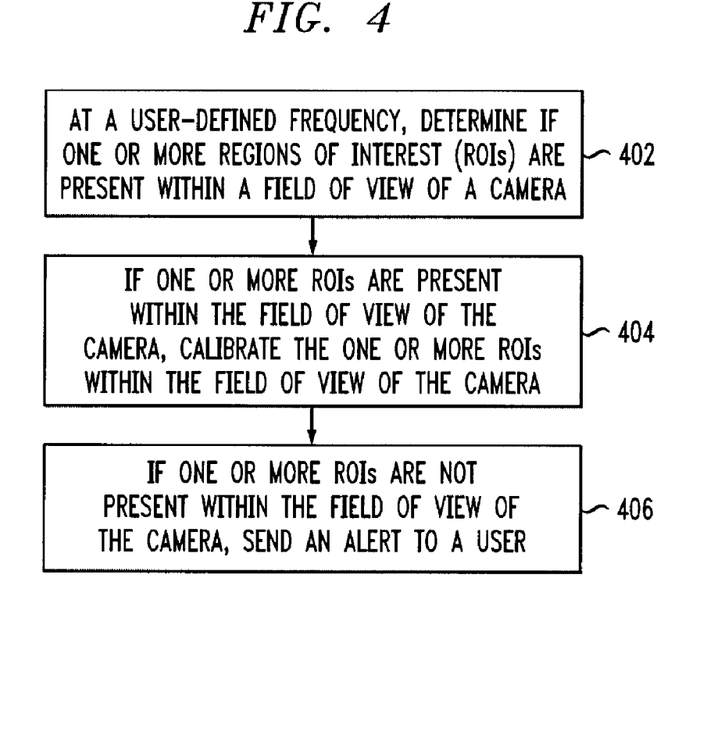
FIG. 4 is a flow diagram illustrating techniques for automatically calibrating one or more regions of interest for video surveillance, according to an embodiment of the present invention.

FIG. 4 is a flow diagram illustrating techniques for automatically calibrating one or more regions of interest for video surveillance, according to an embodiment of the present invention. Step 402 includes at a user-defined frequency, determining if one or more regions of interest (ROIs) (for example, ROIs at a retail checkout environment) are present within a field of view of a camera (for example, a video camera).

Determining if one or more regions of interest are present within a field of view of a camera can, for example, include acquiring a video image, performing motion detection on the video image, tracking foreground moving objects in the video image, extracting features from the foreground moving objects, based on the extracted features, generating a heat map (for example, a spatiotemporal heat map) for a camera field-of-view, wherein the heat map includes motion probabilities and a temporal sequence order between high motion interest regions, and using the heat map to perform temporal matching between visual activities and received recorded activities (for example, a barcode).

Additionally, determining if one or more regions of interest are present within a field of view of a camera can include using one or more models of target regions of interest to locate similar regions of interest in a camera field-of-view. Using models of target regions of interest to locate similar regions of interest in a camera field-of-view can include collecting a set of pre-selected region of interest models, obtaining a video image, extracting a set of features from the video image, using spatial features of the video image to construct region of interest templates, and comparing the templates with feature maps of the video image. One or more embodiments of the invention can also include locating a region in the camera field-of-view and using domain knowledge and the located region to locate spatially related regions of interest. Additionally, the techniques described herein can include outputting a set of target regions of interest that correspond to high-interest regions in the camera field-of-view.

Step 404 includes if one or more ROIs are present within the field of view of the camera, automatically calibrating the one or more ROIs within the field of view of the camera. Automatically calibrating the ROIs can include automatically (re)locating the ROIs in the camera field of view. This can occur, for example, when the calibration system is first connected to the camera (it "searches" for ROIs using domain-specific knowledge) and/or periodically in case the camera has been moved. By way of example, in one or more embodiments of the invention, the ROIs can be drawn according to a location of user-defined items. The user-defined items can include, for example, a checkout area, an entry area, an entry belt, a scan area, a scanner, a barcode scanner, an exit area, an exit belt, a cashier work area, a register, a customer area, a credit card terminal, a receipt printer, a lane open sign, a lane closed sign, a keyboard entry area, etc.

Step 406 includes if one or more ROIs are not present within the field of view of the camera, sending an alert to a user (for example, an alert to manually adjust the camera).

The techniques depicted in FIG. 4 can also include generating a heat map that reflects activity in one or more ROIs. Also, if the activity reflected in the heat map is inconsistent with an expected level of activity for the one or more ROIs, one or more embodiments of the invention send an alert to a user. By way of illustration, the transaction log characterizes the actual activity at the checkout station. Similarly, a heat map characterizes the activity in each ROI. The mode (spaces of high activity) of the heat map and transaction log should agree if the ROIs have been properly calibrated. If they do not agree, this is an indication that the calibration process failed, and an alert should be sent to a user.

Additionally, the techniques described herein can include validating that activity in a scanner region corresponds to transaction item entry events for a user-defined period of time. If the activity in a scanner region does not correspond to transaction item entry events for a user-defined period of time, one or more embodiments of the invention can send an alert to a user.

Further, one or more embodiments of the present invention can include processing the ROIs in an activity analysis module (for example, a checkout station activity analysis module). Additionally, one or more embodiments of the invention can be implemented to any situation in which a certain amount of domain knowledge is available.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
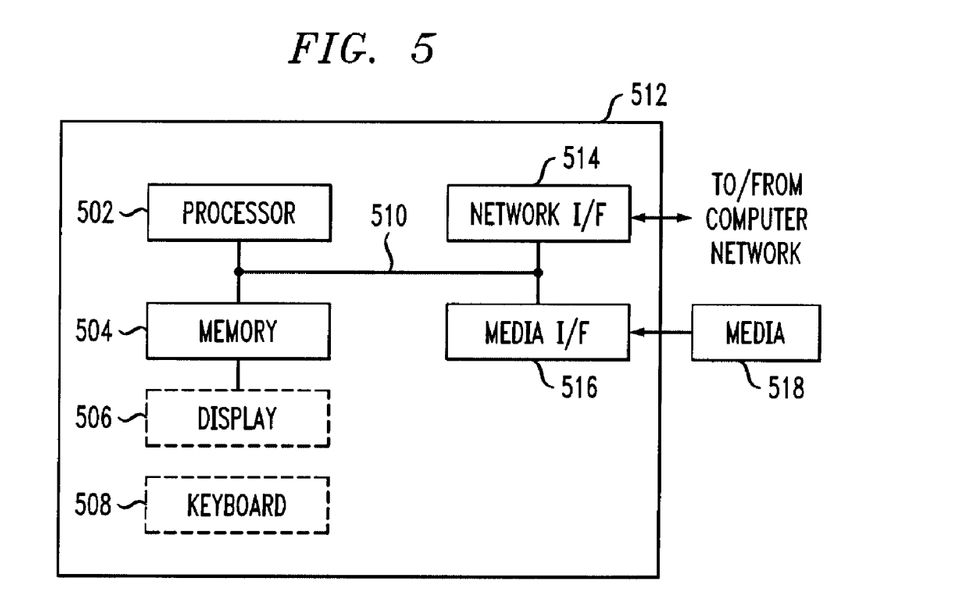
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using an automatic multi-layered validation scheme for correct ROI calibration.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for automatically calibrating one or more regions of interest for video surveillance, comprising the steps of:
    at a user-defined frequency, determining if one or more regions of interest are present within a field of view of a camera via:
        performing motion detection on a video image;
        tracking one or more foreground moving objects in the video image;
        extracting one or more features from the one or more foreground moving objects;
        generating a spatiotemporal heat map for the camera field-of-view based on the one or more extracted features, with values in the heat map representing motion probabilities at corresponding image locations to produce a temporal sequence order between multiple high motion interest regions; and
        temporally matching one or more visual activities from the video image based on the heat map and one or more recorded activities received from a source independent of the video image;
    if one or more regions of interest are present within the field of view of the camera, automatically calibrating the one or more regions of interest within the field of view of the camera by positioning the one or more regions of interest within the field of view of the camera; and
    if one or more regions of interest are not present within the field of view of the camera, sending an alert to a user to assess status of the camera.

2. The method of claim 1, wherein sending an alert to a user comprises sending an alert to a user to manually adjust the camera.

3. The method of claim 1, further comprising outputting a set of one or more target regions of interest that correspond to one or more high-interest regions in the camera field-of-view.

4. The method of claim 1, further comprising, if an activity reflected in the heat map is inconsistent with an expected level of activity for the one or more regions of interest, sending an alert to a user.

5. The method of claim 1, wherein determining if one or more regions of interest are present within a field of view of a camera comprises using one or more models of one or more target regions of interest to locate one or more similar regions of interest in a camera field-of-view.

6. The method of claim 5, wherein using one or more models of one or more target regions of interest to locate one or more similar regions of interest in a camera field-of-view comprises:
    collecting a set of one or more pre-selected region of interest models;
    obtaining a video image;
    extracting a set of one or more features from the video image;
    using one or more spatial features of the video image to construct one or more region of interest templates; and
    comparing the one or more templates with one or more feature maps of the video image.

7. The method of claim 6, further comprising:
    locating one region in the camera field-of-view; and
    using domain knowledge and the located region to locate one or more spatially related regions of interest.

8. The method of claim 6, further comprising outputting a set of one or more target regions of interest that correspond to one or more high-interest regions in the camera field-of-view.

9. The method of claim 1, further comprising validating that activity in a scanner region corresponds to transaction item entry events for a user-defined period of time.

10. The method of claim 9, further comprising, if the activity in a scanner region does not correspond to transaction item entry events for a user-defined period of time, sending an alert to a user.

11. The method of claim 1, wherein one or more regions of interest are drawn according to a location of one or more user-defined items.

12. The method of claim 11, wherein the one or more user-defined items comprise at least one of a checkout area, an entry area, an entry belt, a scan area, a scanner, a barcode scanner, an exit area, an exit belt, a cashier work area, a register, a customer area, a credit card terminal, a receipt printer, a lane open sign, a lane closed sign and a keyboard entry area.

13. The method of claim 1, further comprising processing the one or more regions of interest in an activity analysis module.

14. The method of claim 1, wherein determining if one or more regions of interest are present within a field of view of a camera comprises determining if one or more regions of interest at a retail checkout environment are present within the field of view of the camera.

15. A computer program product comprising a non-transitory tangible computer readable recordable storage medium having computer readable program code for automatically calibrating one or more regions of interest for video surveillance, said computer program product including:
  computer readable program code for, at a user-defined frequency, determining if one or more regions of interest are present within a field of view of a camera via:
  performing motion detection on a video image;
    tracking one or more foreground moving objects in the video image;
    extracting one or more features from the one or more foreground moving objects;
    generating a spatiotemporal heat map for the camera field-of-view based on the one or more extracted features, with values in the heat map representing motion probabilities at corresponding image locations to produce a temporal sequence order between multiple high motion interest regions; and
    temporally matching one or more visual activities from the video image based on the heat map and one or more recorded activities received from a source independent of the video image;
  computer readable program code for, if one or more regions of interest are present within the field of view of the camera, automatically calibrating the one or more regions of interest within the field of view of the camera by positioning the one or more regions of interest within the field of view of the camera; and
  computer readable program code for, if one or more regions of interest are not present within the field of view of the camera, sending an alert to a user to assess status of the camera.

16. The computer program product of claim 15, wherein the computer readable program code for determining if one or more regions of interest are present within a field of view of a camera comprises computer readable program code for using one or more models of one or more target regions of interest to locate one or more similar regions of interest in a camera field-of-view.

17. The computer program product of claim 16, wherein the computer readable program code for using one or more models of one or more target regions of interest to locate one or more similar regions of interest in a camera field-of-view comprises:
  computer readable program code for collecting a set of one or more pre- selected region of interest models;
  computer readable program code for obtaining a video image;
  computer readable program code for extracting a set of one or more features from the video image;
  computer readable program code for using one or more spatial features of the video image to construct one or more region of interest templates; and
  computer readable program code for comparing the one or more templates with one or more feature maps of the video image.

18. The computer program product of claim 17, further comprising:
  computer readable program code for locating one region in the camera field-of-view; and
  computer readable program code for using domain knowledge and the located region to locate one or more spatially related regions of interest.

19. A system for automatically calibrating one or more regions of interest for video surveillance, comprising:
  a memory; and
  at least one processor coupled to said memory and operative to:
  at a user-defined frequency, determine if one or more regions of interest are present within a field of view of a camera via:
    performing motion detection on a video image;
    tracking one or more foreground moving objects in the video image;
    extracting one or more features from the one or more foreground moving objects;
    generating a spatiotemporal heat map for the camera field-of-view based on the one or more extracted features, with values in the heat map representing motion probabilities at corresponding image locations to produce a temporal sequence order between multiple high motion interest regions; and
    temporally matching one or more visual activities from the video image based on the heat map and one or more recorded activities received from a source independent of the video image;
  if one or more regions of interest are present within the field of view of the camera, automatically calibrate the one or more regions of interest within the field of view of the camera by positioning the one or more regions of interest within the field of view of the camera; and
  if one or more regions of interest are not present within the field of view of the camera, send an alert to a user to assess status of the camera.

20. The system of claim 19, wherein in determining if one or more regions of interest are present within a field of view of a camera, the at least one processor coupled to said memory is further operative to use one or more models of one or more target regions of interest to locate one or more similar regions of interest in a camera field-of-view.

21. The system of claim 20, wherein in using one or more models of one or more target regions of interest to locate one or more similar regions of interest in a camera field-of-view, the at least one processor coupled to said memory is further operative to:
  collect a set of one or more pre-selected region of interest models;
  obtain a video image;
  extract a set of one or more features from the video image;
  use one or more spatial features of the video image to construct one or more region of interest templates; and
  compare the one or more templates with one or more feature maps of the video image.

* * * * *